No. 796,905. PATENTED AUG. 8, 1905.
D. P. FUNK.
DEVICE FOR CATCHING AND HOLDING HOGS, &c.
APPLICATION FILED FEB. 21, 1905.
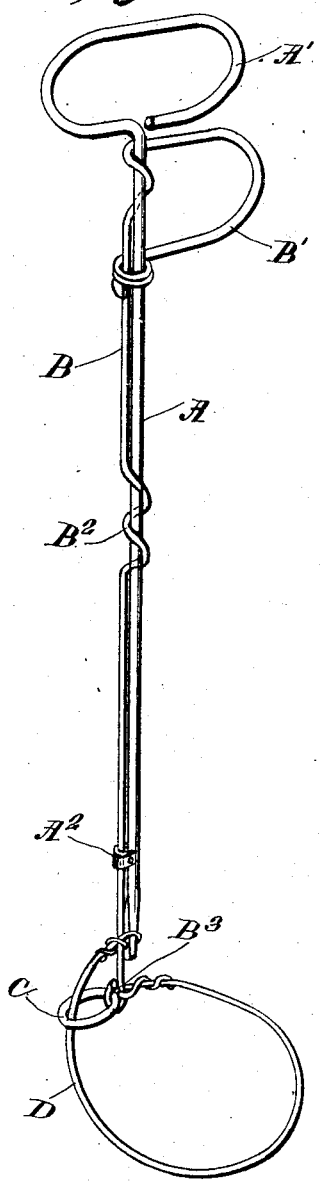
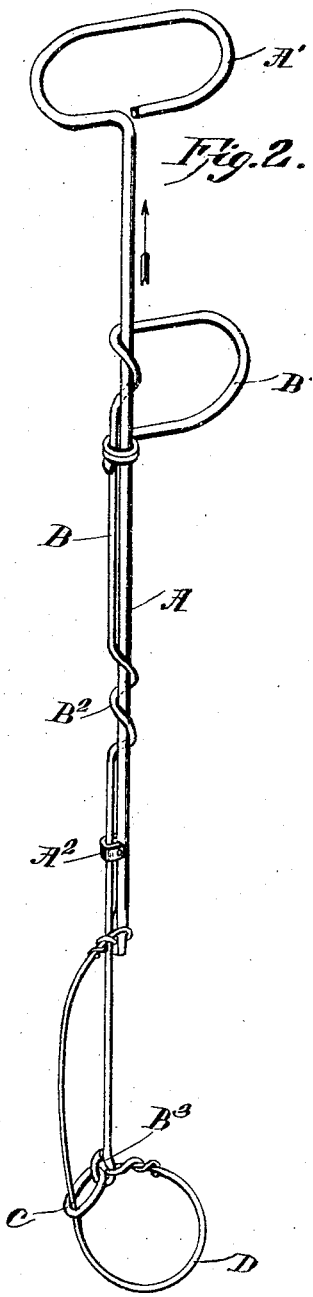
WITNESSES:
INVENTOR
David P. Funk
BY
ATTORNEYS

UNITED STATES PATENT OFFICE.

DAVID PERRY FUNK, OF MONROE, WASHINGTON.

DEVICE FOR CATCHING AND HOLDING HOGS, &c.

No. 796,905.      Specification of Letters Patent.      Patented Aug. 8, 1905.

Application filed February 21, 1905. Serial No. 246,704.

*To all whom it may concern:*

Be it known that I, DAVID PERRY FUNK, a citizen of the United States, and a resident of Monroe, in the county of Snohomish and State of Washington, have invented a new and useful Improvement in Devices for Catching and Holding Hogs, &c., of which the following is a specification.

My invention relates to an improvement in devices for catching and holding hogs, sheep, calves, or other animals while applying rings to their noses and for other purposes.

The object of my invention is to provide a simple, cheap, and efficient device of the character described which can be applied to the nose or leg of the animal while the ringing operation is taking place and one which shall be positive in its action.

To these ends my invention consists in certain novel features of construction, combination, and operation of parts, as will be hereinafter fully described, and pointed out in the claims, reference being had to the accompanying drawings, in which—

Figure 1 is a perspective view of my device ready to be applied to a hog or other animal. Fig. 2 is a similar view showing the position of the parts when the nose or leg of the animal has been caught and is being held.

In carrying out my invention I provide a rod or bar A, having the handhold A' at one end and a loop $A^2$, forming a guide, secured to said rod A near its other end.

B represents a rod somewhat smaller than rod A, bent at its upper end to form a handhold B' and twisted around rod A to hold it in place. At about its center the rod B is turned one or more times around rod A, as shown at $B^2$, and then continues downwardly through the guide-loop $A^2$ and has at its lower end the eye $B^3$.

C is a ring held within the eye $B^3$.

D represents a wire, preferably of copper, one end of which is passed through an opening at the lower end of rod A and then twisted on itself. Wire D then passes through the ring C and is then brought round, forming a loop, and its opposite end fastened to the eye $B^3$. The upper end of rod B after being formed into the handhold B' is wound around itself and the rod A, holding the said rod B in position against the rod A.

When it is desired to catch and hold a hog, the parts being in the position shown in Fig. 1, the loop D is placed around the nose, which can be done when the hog is eating or when it is simply standing in the pen. The loop D having been passed over the hog's nose, the rod A is pulled in the direction indicated by the arrow, whereupon the loop D (which is of wire) will be drawn tightly around the hog's nose and held there, and the more the hog pulls the tighter will become the wire loop D. The ringing operation can now be done quickly and easily, and when it is desired to release the hog the handhold B' will be drawn upwardly toward A', thus increasing the size of the wire loop D and allowing the hog to withdraw its nose. It will of course be understood that the loop D can be passed over the leg, tail, or nose with equal facility and that a hog can be caught nd held from such a distance as the length of ahe rods A and B will permit.

The twists or turns $B^2$ of the rod B around the rod A, together with the guide-loop $A^2$ near the lower end of rod A, maintain the parts of the device in their proper relative position and render certain the action of the device.

It will thus be seen that I provide a simple, cheap, and strong device, the parts of which are not apt to get out of order and one in which if the parts should become broken can be quickly and easily replaced.

Having thus described my invention, what I claim as new, and desire to secure by Letters Patent, is—

1. A device for catching and holding animals consisting of a main rod having a handle at its upper end, a guide-loop secured thereto near its lower end, an auxiliary rod passing through said guide-loop and having a handle at its upper end, a ring secured to the lower end of the auxiliary rod, a flexible loop secured at one end to the lower end of the main rod, thence passing through the ring secured to the auxiliary rod and secured at its other end to the lower end of the auxiliary rod.

2. A device for catching and holding animals consisting of a main rod of metal bent at its upper end to form a handle, an auxiliary rod bent at its upper end to form a handle and twisted intermediate its ends around the main rod, a ring loosely secured to the lower end of the auxiliary rod, a flexible wire loop secured at one end to the lower end of the main rod, thence passing through the loosely-mounted ring at the lower end of the auxiliary rod and secured at its other end to the lower end of the auxiliary rod.

3. A device for catching and holding animals consisting of a main rod of metal bent at its upper end to form a handle, an auxiliary metal rod lying adjacent the main rod and having its upper end bent around the main rod and formed into a handle, said auxiliary rod also twisted intermediate its ends around the body of the main rod, a guide-loop projecting from the main rod near its lower end through which the auxiliary rod passes, a ring loosely secured to the lower end of the auxiliary rod, and a flexible wire loop secured at one end to the lower end of the main rod thence passing through the loosely-mounted ring and secured at its other end to the lower end of the auxiliary rod.

4. A device for catching and holding animals, consisting of a main rod having a handle at its upper end, a guide-loop secured thereto near its lower end, an auxiliary rod passing through said guide-loop and having a handle at its upper end, a loop or eye secured to the lower end of the auxiliary rod, a flexible loop pivotally secured at one end to the lower end of the main rod, thence passing through the loop or eye at the lower end of the auxiliary rod and secured at its other end to the lower end of the auxiliary rod.

5. A device for catching and holding animals consisting of a main rod of metal bent at its upper end to form a handle, an auxiliary rod bent at its upper end to form a handle and embracing the main rod, a loop or eye projecting from the lower end of the auxiliary rod, a flexible loop secured at one end to the lower end of the main rod, thence passing through the loop or eye at the lower end of said auxiliary rod, and secured at its other end to the lower end of the auxiliary rod.

DAVID PERRY FUNK.

Witnesses:
 FRED HARRIS,
 R. J. FAUSSETT.